US009321220B2

(12) United States Patent
Slack et al.

(10) Patent No.: US 9,321,220 B2
(45) Date of Patent: Apr. 26, 2016

(54) AUTOMATED BIAS-PLY PREPARATION DEVICE AND PROCESS

(75) Inventors: Jason Slack, Clinton, UT (US); Christopher J. Madsen, Ogden, UT (US); Don C. Jones, West Haven, UT (US); Vernon M. Benson, Morgan, UT (US); Peter G. Turner, Eden, UT (US); Ralph Douglas Cope, Elkton, MD (US); Kimberly Ann Ferrara, Middletown, DE (US); Anthony Dale Johnson, Conowingo, MD (US); Michael James Case, Newark, DE (US); Jesse Paul Brown, Newark, DE (US); James Gargel, Bear, DE (US); Steven Andrew Cope, Newark, DE (US); Kyle Putnam Tarry, Middletown, PA (US)

(73) Assignee: Orbital ATK, Inc., Plymouth, MN (US)

( * ) Notice: Subject to any disclaimer, the term of this patent is extended or adjusted under 35 U.S.C. 154(b) by 160 days.

(21) Appl. No.: 12/759,333

(22) Filed: Apr. 13, 2010

(65) Prior Publication Data

US 2011/0247743 A1   Oct. 13, 2011

(51) Int. Cl.
*B32B 41/00* (2006.01)
*B29C 70/38* (2006.01)
(Continued)

(52) U.S. Cl.
CPC ............... *B29C 70/38* (2013.01); *B29C 70/20* (2013.01); *B29C 70/22* (2013.01); *B29C 70/50* (2013.01); *B29C 70/545* (2013.01); *B29K 2105/243* (2013.01); *Y10T 156/1052* (2015.01)

(58) Field of Classification Search
CPC .... B29C 70/38; B29C 70/386; B29C 70/545; B64C 1/068; B64C 2001/0072
USPC ........... 156/64, 350, 351, 378, 379, 439, 152, 156/177, 178, 249, 260, 265, 266, 285, 519, 156/552, 580, 583.1
See application file for complete search history.

(56) References Cited

U.S. PATENT DOCUMENTS 3,278,100 A   10/1966  Hornberger
4,256,522 A    3/1981  Britton
(Continued)

FOREIGN PATENT DOCUMENTS

EP        1992872 A2   11/2008
JP       354159476     12/1979
(Continued)

OTHER PUBLICATIONS

Accudyne Systems, Inc. "Three New Composite Machines". [online] [retrieved on Mar. 23, 2010] retrieved at <http://accudyne.com/>.
(Continued)

*Primary Examiner* — Michael N Orlando
*Assistant Examiner* — Joshel Rivera
(74) *Attorney, Agent, or Firm* — TraskBritt

(57) ABSTRACT

A material preparation device is provided. The material preparation device includes a bias-ply assembly, a feedstock assembly and an application head. The bias-ply assembly is configured to pass a bias-ply backing material along a first path. The feedstock assembly is configured to pass a feedstock along a second path that crosses the first path at a select angle. The feedstock includes resin pre-impregnated fiber reinforced material (pre-preg) having the fibers at a first orientation relative to an edge of the feedstock. The application head is configured to transfer the pre-preg from the feedstock to the bias-ply backing material at a location where the first path crosses the second path to form a bias-ply with the fibers of the pre-preg having a second different orientation relative to an edge of the formed bias-ply.

19 Claims, 12 Drawing Sheets

(51) Int. Cl.
  B29C 70/20 (2006.01)
  B29C 70/22 (2006.01)
  B29C 70/50 (2006.01)
  B29C 70/54 (2006.01)
  B29K 105/24 (2006.01)

(56) References Cited

U.S. PATENT DOCUMENTS

| | | | |
|---|---|---|---|
| 4,402,888 | A | 9/1983 | Runck |
| 4,460,531 | A | 7/1984 | Harris et al. |
| 4,548,770 | A | 10/1985 | Holland |
| 4,591,402 | A | 5/1986 | Evans et al. |
| 4,929,319 | A | 5/1990 | Dinter et al. |
| 5,024,862 | A * | 6/1991 | Frank .................. 427/264 |
| 5,173,137 | A | 12/1992 | Okihara et al. |
| 5,173,138 | A | 12/1992 | Blauch et al. |
| 5,351,111 | A | 9/1994 | Takafuji et al. |
| 5,413,815 | A | 5/1995 | Williams et al. |
| 5,685,416 | A * | 11/1997 | Bonnet ................. 198/812 |
| 5,795,426 | A | 8/1998 | Jackson et al. |
| 6,050,517 | A | 4/2000 | Dobrescu et al. |
| 6,073,670 | A | 6/2000 | Koury |
| 7,086,627 | B2 | 8/2006 | Kehler et al. |
| 7,540,447 | B2 | 6/2009 | Shiraishi et al. |
| 2001/0015317 | A1 | 8/2001 | Kawabe et al. |
| 2003/0199337 | A1 | 10/2003 | Hebert et al. |
| 2004/0026025 | A1 | 2/2004 | Sana et al. |
| 2006/0003133 | A1 | 1/2006 | Johnson |
| 2007/0017628 | A1 | 1/2007 | Evans |
| 2009/0301642 | A1 * | 12/2009 | Patel et al. ............... 156/152 |
| 2011/0192535 | A1 | 8/2011 | Turner |

FOREIGN PATENT DOCUMENTS

| | | |
|---|---|---|
| JP | 02-153938 | 6/1990 |
| JP | 6-024615 | 2/1994 |
| JP | 11-180607 | 7/1999 |
| JP | 2001213557 | 2/2000 |
| JP | 2002124148 A | 4/2002 |
| JP | 2004314565 | 4/2003 |
| JP | 2009070796 A | 4/2009 |

OTHER PUBLICATIONS

European Communication: Partial European Search Report for European Patent Application EP10189022.6, mailed Aug. 18, 2011.
U.S. Appl. No. 12/701,126, filed Feb. 5, 2010, Turner.
Translation of Office Action from Japanese Patent Application No. 2010-266467, mailed Oct. 24, 2012, 4 pages.
Japanese Decision of Rejection for Japanese Patent Application No. 2010-266467 mailed Jul. 29, 2013, 5 pages.
Strobel, Market al., A Comparison of Corona-Treated and Flame-Treated Polypropylene Films. Plasmas and Polymers, vol. 8, No. 1 (Mar. 2003), pp. 61-95.
Zander, Nicole et al., Oxidation of Polyethylene: A Comparison of Plasma and Ultraviolet Ozone Processing Techniques. Army Research Laboratory, Aberdeen Proving Ground, MD 21005-5069, ARL-TR-4701 (Jan. 2009), 21 pages.
Office Action for Japanese Patent Application No. 2013-223432, issued Aug. 3, 2015, 10 pages.
Author Omitted; "Comments of Third Party"; Japanese Patent Application No. 2013-223432; received by the Esquire Commissioner of the Japanese Patent Office on Dec. 23, 2015; 8 pages.

* cited by examiner

AUTOMATED BIAS-PLY PREPARATION DEVICE AND PROCESS

BACKGROUND

In the formation of composite laminate structures, layers of pre-impregnated material (pre-preg) are typically laid up over each other, compacted and heat set (cured or fused) to form the composite laminate structure. Pre-preg is made of reinforcing fibers such as carbon, glass, aramid, and the like, that are bonded together with a resin system. Often to achieve a desired laminate characteristic, the plies of pre-preg are layered with their fibers having different orientations in relation to each other to tailor the laminates structural properties. For example, in applications for forming high strength-low weight complex shaped structures it may be desired to apply and form one layer of pre-preg at a time on a tool with one or more of the different layers having different fiber orientations than another layer. However, pre-preg (resin pre-impregnated fiber reinforced material) is typically only supplied by a manufacture as 0° tape (with all its fibers orientated in one direction in relation to an edge of the pre-preg roll) or 0/90 fabric (continuous fiber in the roll-up direction, 0°, with discontinuous woven or stitched fibers running transverse to the roll-up direction, 90°). It is desired to have an efficient method of forming pre-preg supply rolls with many different fiber orientations; so that successive layers of pre-preg can be automatically applied and formed over long narrow structures, with layers having different fiber orientations. Examples of common orientations, besides 0 degree and 0/90 degree, that are needed in a continuous roll format include, but are not limited to, 30°, 45°, 60°, 90°, 120°, 135°, and 150°. Combinations of these are also needed, including but not limited to, 45°/135°, 60°/150°, 30°/120°.

For the reasons stated above and for other reasons stated below which will become apparent to those skilled in the art upon reading and understanding the present specification, there is a need in the art for a process and device to automatically form a continuous bias-ply roll of material having fibers at a select orientation.

BRIEF SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a material preparation device is provided. The material preparation device includes a bias-ply assembly, a feedstock assembly, an application head and controller. The bias-ply assembly is configured to pass a bias-ply backing material along a first path. The feedstock assembly is configured to pass a feedstock along a second path that crosses the first path at a select angle. The feedstock includes resin pre-impregnated fiber reinforced material (pre-preg) having the fibers at a first orientation relative to an edge of the feedstock. The application head is configured to transfer the pre-preg from the feedstock to the bias-ply backing material at a location where the first path crosses the second path to form a bias-ply with the fibers of the pre-preg having a second different orientation relative to an edge of the formed bias-ply. The controller is configured to control the bias-ply assembly to pass the bias-ply backing material. The controller is further configured to control the feedstock assembly to pass the feedstock. The controller is further yet configured to control the application head in transferring the pre-preg.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout the figures and the specification.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
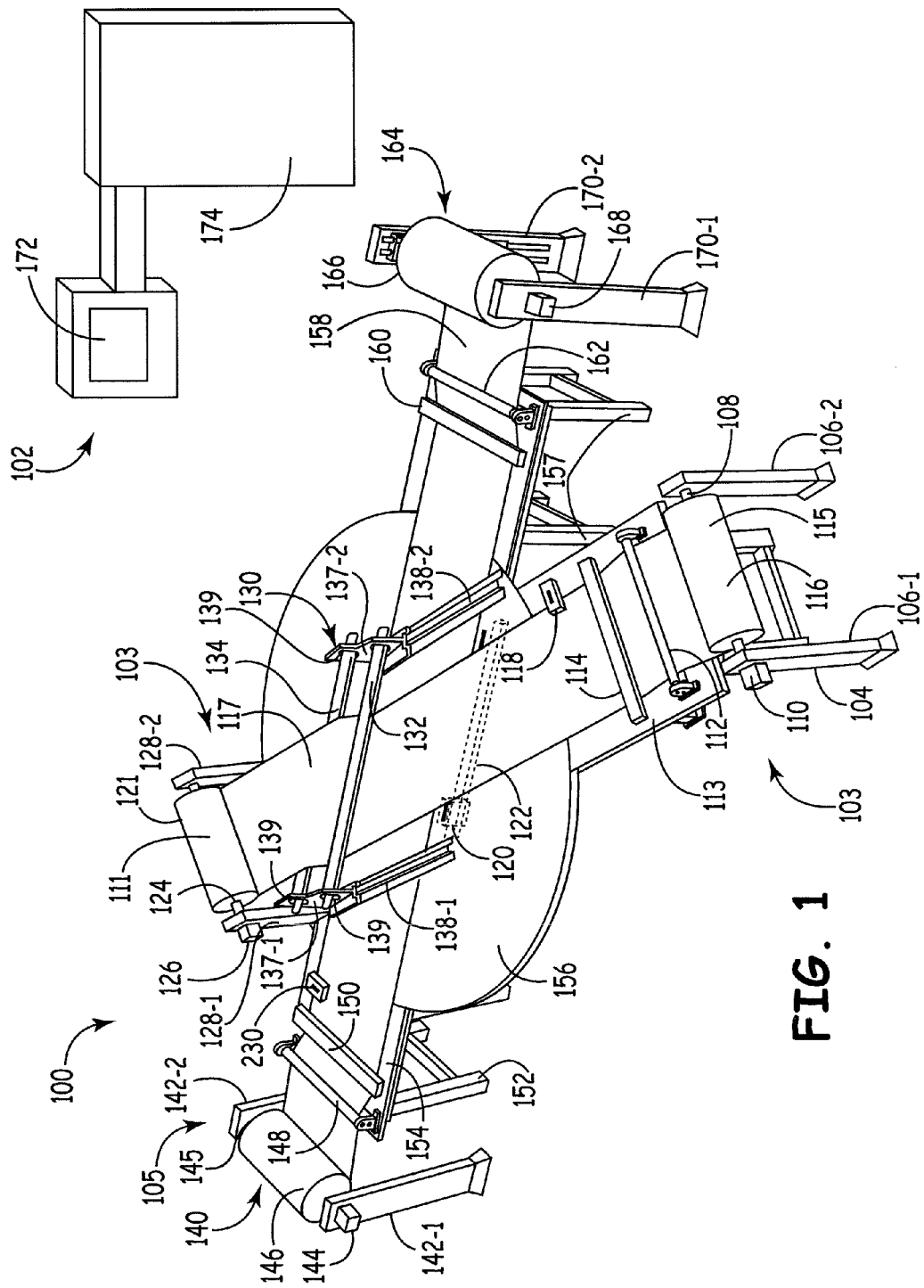
FIG. 1 is a side perspective view of a material preparation machine of one embodiment of the present invention.

Embodiments of the present invention provide devices and methods that automatically convert pre-preg material of select fiber orientations relative to the roll from a manufacture (such as 0° uni-directional tape (uni-tape) or 0/90 fabric) into a bias-ply having the fibers at a different select orientation relative to the roll. Referring to FIG. 1, a material preparation device 100 of an embodiment is illustrated. The material preparation device 100 can generally be referred to as a material preparation machine (MPM) 100. The MPM 100 includes a control system 102 that controls operations of the MPM 100. The control system 102 is further discussed below. The MPM 100 also includes a feedstock assembly 103 and a bias-ply assembly 105. The feedstock assembly 103 includes a roll of feedstock material (generally uni-tape or 0/90 fabric) 116. The feedstock 116 includes feedstock backing material 117 and resin pre-impregnated fiber reinforced material (pre-preg) 300 (illustrated in FIGS. 3A through 3D). The pre-preg includes fibers that are typically oriented at 0° to an edge of material (parallel with the edge of the roll) and a resin that is cured or fused by heat. The bias-ply assembly 105 includes a roll of new bias-ply backing material 146 upon which the pre-preg 300 from the feedstock 116 is placed in a select orientation to form a bias-ply 158. Hence the bias-ply 158 will have a select orientation relating to the orientation of the fibers in the pre-preg 300 such as but not limited to 30°, 45°, 60°, 90°, 120°, 135°, and 150°. The bias-ply backing material 146 can be made from any suitable material such as, but not limited to, polyethylene, paper or other carrier. In some embodiments, the bias-ply backing material 146 initially has no pre-applied pre-preg material adhered to it. A single bias-ply can be formed onto this bias-ply backing material 146, having its fibers at a select orientation.

The feedstock assembly 103 includes a feedstock supply roll unwind assembly 104 and a feedstock backing material gathering assembly 121. The feedstock supply unwind assembly 104 includes a first feedstock support 106-1 and a second feedstock support 106-2. A feedstock unwind chuck 108 is rotationally attached between the first and second feedstock supports 106-1 and 106-2. A feedstock unwind chuck tension motor 110 is coupled to rotate feedstock unwind chuck 108. In use, a feedstock unwind 115 including a roll of feedstock 116 is mounted on the feedstock unwind chuck 108. The feedstock 116 is threaded between feed out pinch rollers 112 that in one embodiment are driven by a servo motor (not shown). A guide 114 is coupled to a feedstock support table 113. The feedstock 116 passes through guide 114. An alignment sensor 118 senses the alignment of the feedstock 116 and is in communication with a controller 174 of the control system 102. The feedstock 116 further passes through an application head 130. The application head 130 includes an application shoe bar 132 (first bar) and a turn bar 134 (second bar) that are retained between brackets 137-1 and 137-2. Ends of the application shoe bar 132 and turn bar 134 are received in respective slots 139 of retaining brackets 137-1 and 137-2. The slots 139 allow the forming bars 132 and 134 to move in a vertical direction. The retaining brackets 137-1 and 137-2 are slidably coupled to cross travel tracks 138-1 and 138-2. This sliding connection allows the brackets 137-1 and 137-2 and hence application shoe bar 132 and turn bar and 134, to move horizontally across a width of the backing material 146. Movement of the application head 130 is further discussed below.

Also illustrated in FIG. 1 is cutter 120 that works in conjunction with the application head 130 to cut the pre-preg 300 from the feedstock 116. The cutter 120 is slidably coupled to a cutting track 122 that enables the cutter 120 to cut all the pre-preg 300 across a width of the feedstock 116 but not the feedstock backing material 117. In one embodiment, the cutter 120 is a scribe cutter. After the pre-preg 300 has been cut by the cutter 120, the remaining feedstock backing material 117 (without the pre-preg 300) is then collected on the feedstock backing material gathering assembly 121. The feedstock material gathering assembly 121 includes a feedstock backing material roll-up chuck 124 that collects the feedstock backing material 117 on a feedstock backing windup 111. The feedstock backing material roll-up chuck 124 is rotationally coupled between backing material supports 128-1 and 128-2. A feedstock backing material roll-up tension motor 126 is used to rotate the feedstock backing material roll-up chuck 124. Similarly, the feedstock roller of assembly 104 includes a feedstock roll-off tension motor 110 to rotate the feedstock roll-off 108. The controller 174 of the control system 102 controls the operation of the feedstock backing material roll-up tension motor 126 and the feedstock roll-off tension motor 110.

The bias-ply assembly 105 of the MPM 100 includes a bias-ply backing material feed assembly 140 and a bias-ply gathering assembly 164. The bias-ply backing material feed assembly 140 provides a new backing material 146 upon which the bias-ply 158 is formed. The bias-ply backing material feed assembly 140 includes a bias-ply backing material roll-off chuck 205 (illustrated in FIG. 2) that retains the bias-ply backing material 146 on a roll-off 145 and is rotationally coupled between supports 142-1 and 142-2. A bias-ply backing material roll-off tension motor 144 is used to rotate tension the bias-ply backing material roll-off 205 which is controlled by the controller 174 of control system 102. The bias-ply backing material 146 is passed between backing redirect rollers 148 that are, in one embodiment, motorized by a servo motor (not shown). The bias-ply backing material 146 then passes between bias-ply backing material guide 150 and support table 154. In one embodiment, material guide 150 includes a bias-ply backing material treatment device 453 to increase the tackiness of the bias-ply backing material 146. The backing treatment device 453 is further described with regard to FIG. 4, discussed below. A bias-ply alignment sensor 230 senses the alignment of the bias-ply backing material 146 and is in communication with the controller 174 of the control system 102.

Support table 154 includes support legs 152 and 157. The bias-ply backing material 146 passes under an application shoe 132 and turn bar 134 of the application head 130. The application head 130 transfers the pre-preg with the 0° orientation fibers on the feedstock 116 to the bias-ply backing material 146 that is at a select angle in relation to the bias-ply backing material 146 to achieve a desired fiber orientation in the formed bias-ply 158. The formed bias-ply 158 passes between a bias-ply guide 160 and support table 154 and then between nip rollers 162. In one embodiment, the bias-ply guide 160 further includes a defect (flaw) detector such as defect detector 451, discussed below in regards to FIG. 4. Moreover, in one embodiment, the nip rollers 162 are heated nip rollers 162. In this embodiment, the heated nip rollers 162 heats the fibers 300 to help adhere the fibers 300 to the bias-ply backing material 146. The formed bias-ply 158 is then gathered by a bias-ply gathering assembly 164. The bias-ply gathering assembly 164 includes a bias-ply roll-up 166 to collect the bias-ply 158, which can generally be referred to as a "bias-ply roll-up." The bias-ply roll-up 166 is rotationally coupled to supports 170-1 and 170-2. A bias-ply roll-up tension motor 168 is coupled to rotate the bias-ply roll-up 166. The bias-ply roll-up tension motor 168 is controlled by the controller 174 of the control system 102. The control system 102 further includes a control console 172 that provides input and output information to the control system 102. In one embodiment, the control console 172 is a touch screen display.

Figure 2:
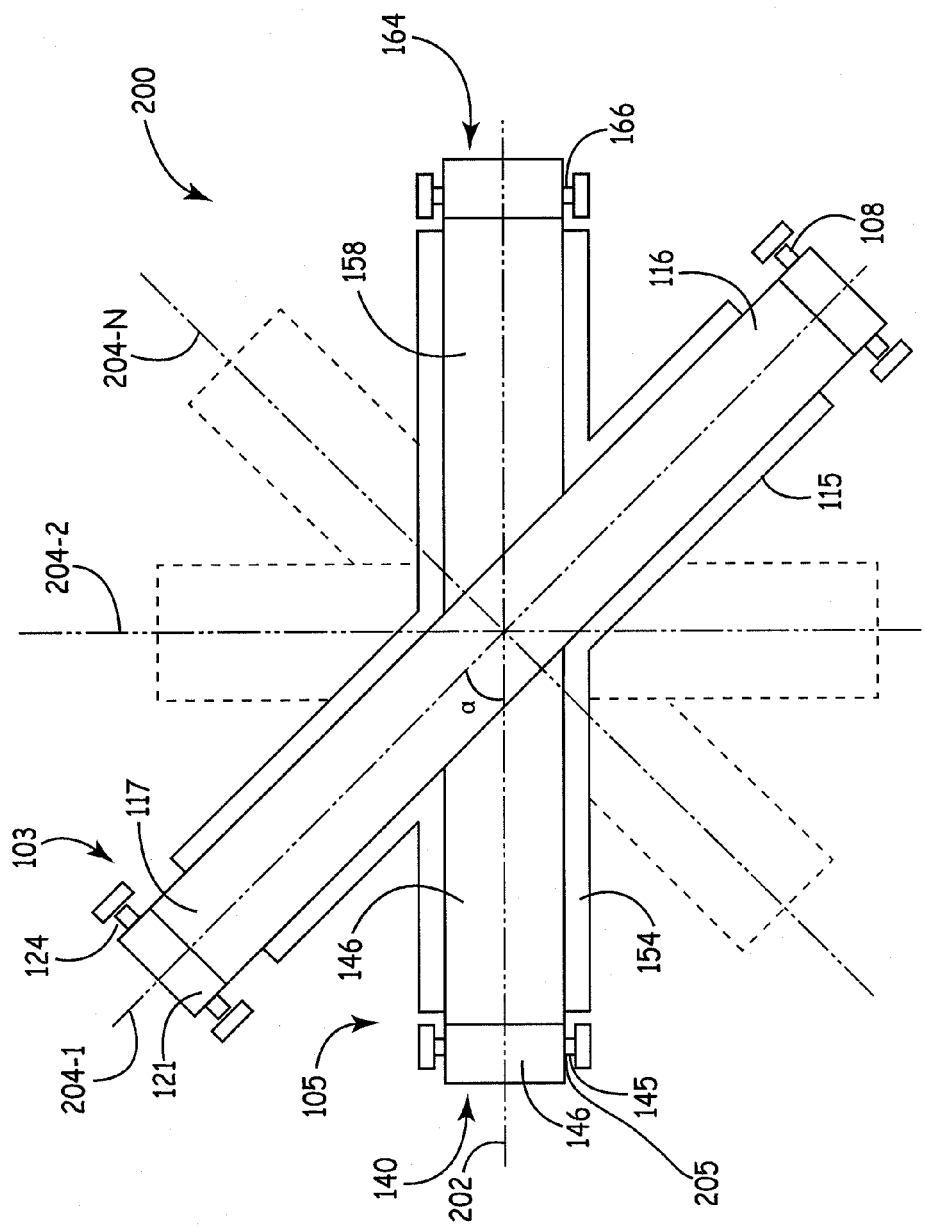
FIG. 2 is a top view of a material preparation machine illustrating different possible orientations of one embodiment of the present invention.

The MPM 100, as discussed above, forms a bias-ply 158 having fibers at a select orientation from a 0° fiber orientation feedstock 116. In this example embodiment, the select orientation of the bias-ply 158 is determined by the angle in which a path the feedstock 116 of the feedstock assembly 103 crosses a path of the bias-ply backing material 146 of the bias-ply assembly 105. In other embodiments, where the feedstock does not have a 0° fiber orientation, the orientation of the fibers in the formed bias-ply is determined by taking into consideration the fiber orientation in the pre-preg of the feedstock and the angle between the two paths. In the embodiment of FIG. 1, a round base support 156 is coupled to support table 154 of the bias-ply assembly 105. The feedstock assembly 104, however, is rotationally coupled to the round base support 156. Hence, the orientation of the feedstock assembly 103 can be changed in relation to the bias-ply assembly 105. This is further illustrated in FIG. 2. In particular, FIG. 2 illustrates a top view of a partial MPM assembly 200. The bias-ply assembly 105 is positioned along axis 202. The feedstock assembly 103 is positioned along axis 204-1. Axis 204-1 is positioned at a select angle α in relation to bias-ply axis 202 of the bias-ply assembly 105. Hence, with the feedstock 116 having fibers at a 0° orientation, the resulting orientation of the fibers in the formed bias-ply 158 will be angle α. In embodiments, angle α is adjusted by rotating the feedstock assembly 103 in relation to the bias-ply assembly 105. Different angles α that achieve different ply orientations in the bias-ply 158 as indicated by axis 204-2 and 204-N are possible. Example a angles include 45° between bias-ply axis 202 and feedstock axis 204-1, 90° between bias-ply axis 202 and feedstock axis 204-2 and 135° between bias-ply axis 202 and feedstock axis 204-N. The above values for angle α are only examples, angle α can be any angle typically between 17.5° and 172.5°.

Figure 3A:
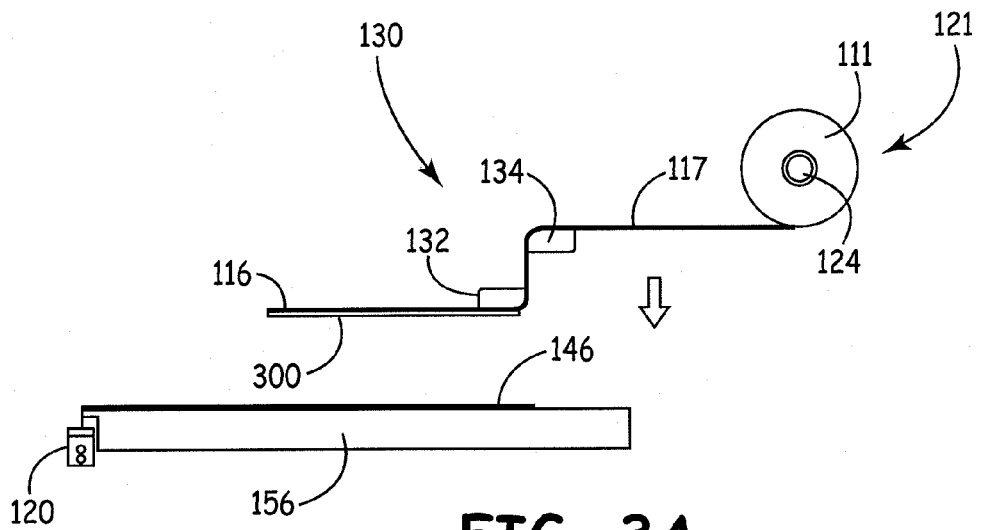
FIGS. 3A through 3D illustrate side views of an application head of one embodiment of the present invention forming bias-ply.

Referring to FIGS. 3A through 3E, side views of a portion of the application head 130, of one embodiment, is provided. FIGS. 3A through 3E illustrate the operation of the application head 130. FIG. 3A illustrates a first position of the application head 130 at the start of a cycle. In this position, application shoe 132 (first bar) and turn bar 134 (second bar) are raised a distance from the bias-ply backing material 146. In the embodiment of FIG. 1, the application shoe 132 and turn bar 134 are positioned away from the bias-ply backing material 146 via slots 139 in brackets 137-1 and 137-2. In this embodiment, an activation member, such as a pneumatic cylinder (not shown) controlled by the controller 174 (FIG. 1) moves the application shoe 132 and turn bar 134 in the respective slots 139 select distances from the bias-ply backing material 146. In the embodiment of FIGS. 3A through 3E, the application head 130 is coupled to the feedstock backing material assembly 121 that feedstock backing windup 111 to collect the old backing material 117 from the feedstock. Hence, in this embodiment, as illustrated in FIGS. 3A through FIG. 3E, the application head 130 and the feedstock backing windup 111 selectively move in a horizontal direction. This horizontal movement is done with a linear actuator (not shown) that is under the control of the controller 174.

Figure 3B:
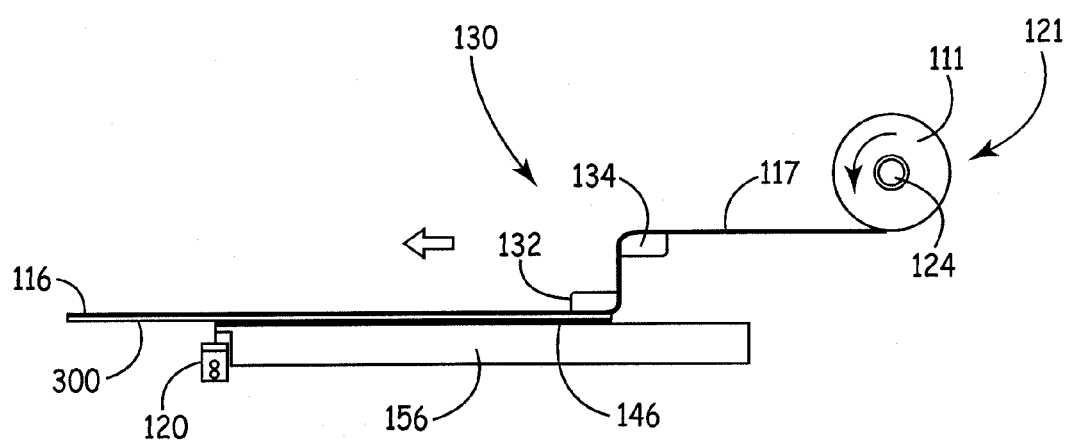
Figure 3C:
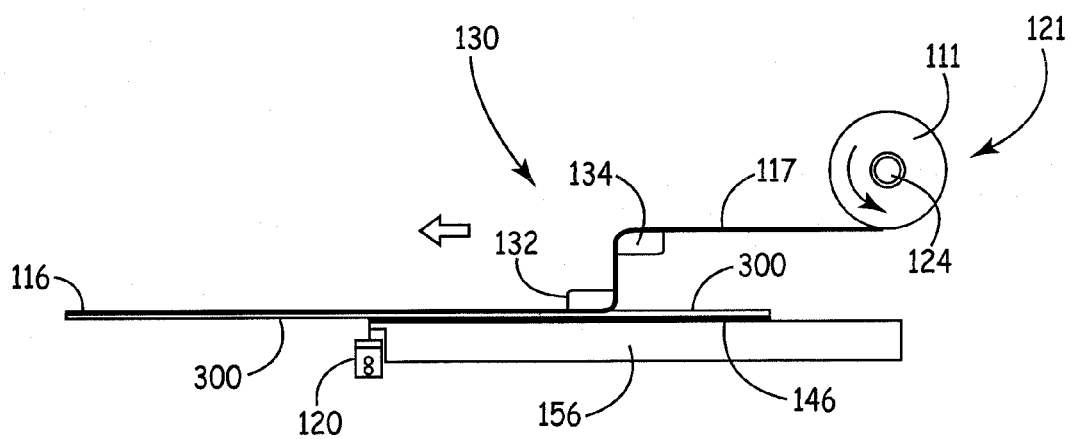
Figure 3D:
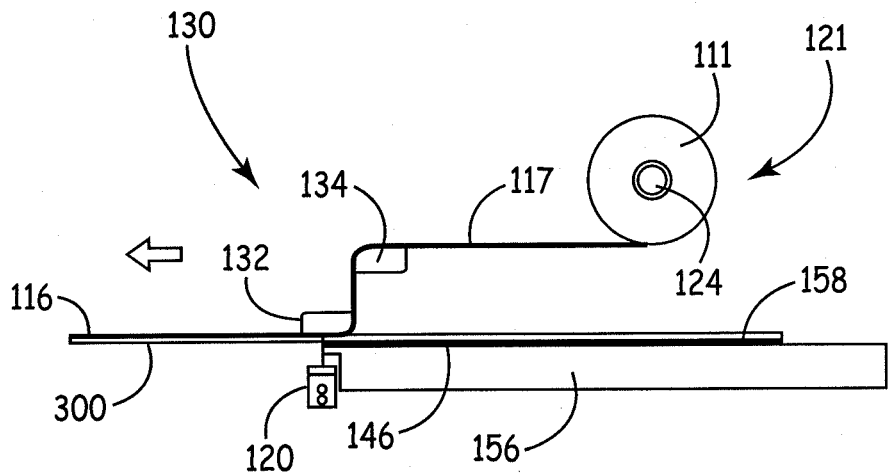
Figure 3E:
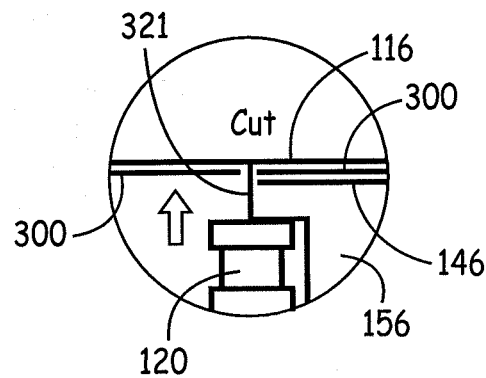
FIG. 3E is a close up view of a cutter of one embodiment of the present invention.

As FIG. 3A illustrates, the feedstock 116 is initially lowered to the bias-ply backing material 146 in the beginning of a cycle. The feedstock 116 include feedstock backing material 117 and pre-preg 300. The pre-preg 300, in an embodiment, includes material with reinforcing fibers and resin. Once the feedstock 116 is lowered onto the bias-ply backing material 146, as illustrated in FIG. 3B, the application head 130 then moves in a horizontal direction across a width of the bias-ply backing material 146 with shoe 132 pressing the feedstock 116 onto the bias-ply backing material 146. In particular, as the application head 130 moves horizontally across the bias-ply backing material 146, as illustrated in FIG. 3C, bar 132 (or shoe) of the application head 130 presses the pre-preg 300 onto the bias-ply backing material 146. Bar 132 also peels off the feedstock backing material 117 from the pre-preg 300, once the pre-preg 300 is applied to the bias-ply backing material 146. Bar 134 (second bar) directs the peeled off feedstock backing material 117 to feedstock backing windup 111. As illustrated, the feedstock backing windup 111 is rotated during the process to windup the feedstock backing material 117, and move the feedstock along in the forming process. Bar 132 of the application head 130 presses the pre-preg 300 onto the bias-ply backing material 146 until it reaches and end of the width of the bias-ply backing material 146, as illustrated in FIG. 3D. At that point, the pre-preg 300 is cut by cutter 120. A close up view of a cut is illustrated in FIG. 3E. As illustrated, a blade 321 of cutter 120 cuts the pre-preg 300 of the feedstock 116, but does not cut the feedstock backing material 117. Once, the cut is made by the cutter 120, the application head 130 is lifted vertically and moved to the position as illustrated in FIG. 3. A new cycle will start when the formed bias-ply 158 is moved out of the forming area of the application head 130. This process continues until a bias-ply 158 of a select length is made. Hence, the application head 130 automatically lays down pre-preg 300 from the feedstock 116 on the bias-ply backing material 146 one section after another until a roll of bias-ply 158 is formed. A gap or overlap distance between adjacent sections of pre-preg 300 is selectively controlled in embodiments based on the application. An example gap distance would be between no overlap to 0.050 of an inch. An example of an overlap would be where pre-preg fabric material is intentionally overlapped by 1 inch at all bias-ply joints. Other types of application heads are contemplated, such as, but not limited to, an application head using rollers. Hence, the present invention is not limited to the application head disclosed in FIGS. 3A through 3D.

Figure 4:
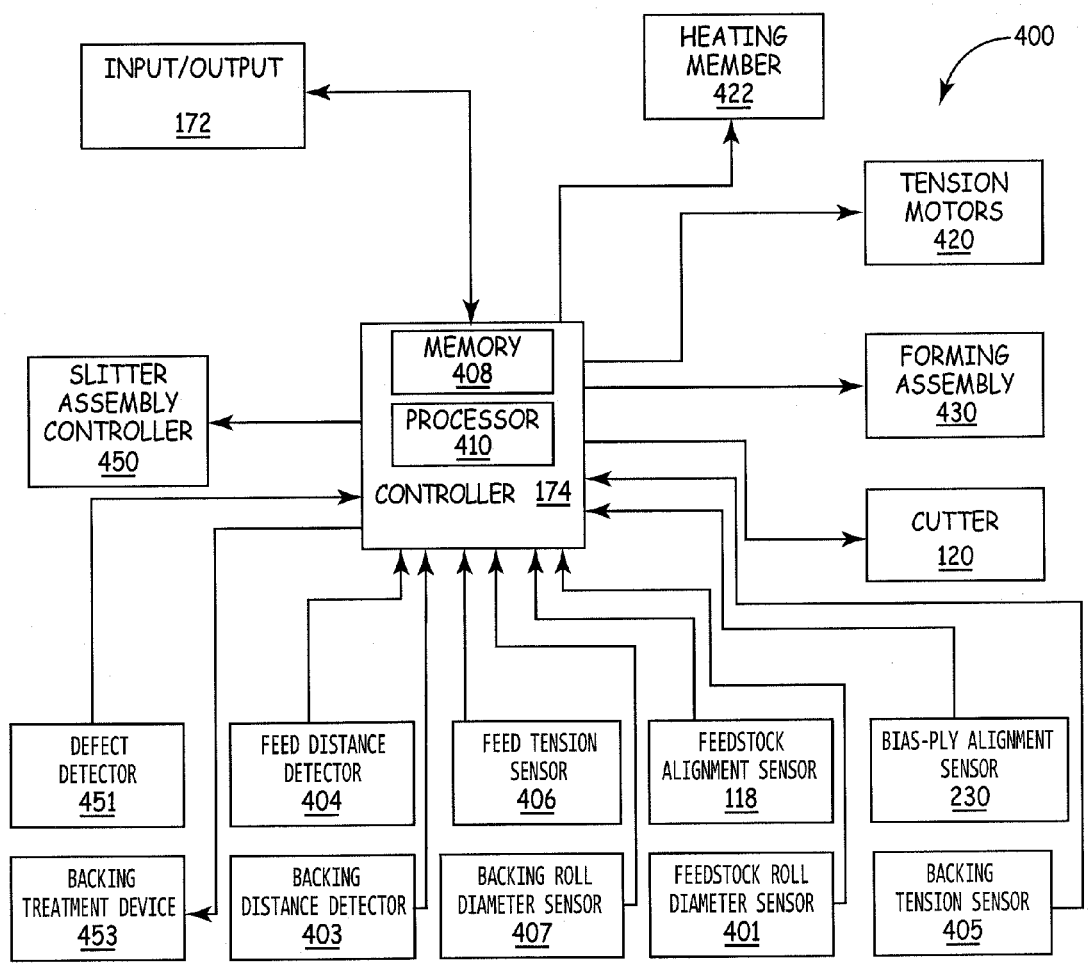
FIG. 4 is a block diagram of a material preparation machine of one embodiment of the present invention.

FIG. 4 illustrates a block diagram of a MPM 400 of one embodiment. As illustrated, this embodiment includes a controller 174. The controller controls functions of the MPM 400. The controller 174 includes a processor 410 and a memory 408 to store instructions implemented by the processor 410. A processor, in general includes or functions with software programs, firmware or computer readable instructions for carrying out various methods, process tasks, calculations, and control functions. These instructions are typically tangibly embodied on any appropriate medium, such as memory 408, used for storage of compute-readable instructions or data structures. Such computer-readable media can be any available media that can be accessed by a general purpose or special purpose computer or processor, or any programmable logic device. Suitable computer-readable media may include storage or memory media such as magnetic or optical media, e.g., disk or CD-ROM, volatile or non-volatile media such as RAM (e.g. SDRAM, DDR SDRAM, RDRAM, SRAM, etc.), ROM, EEPROM, Flash memory, etc.

As FIG. 4 further illustrates, the MPM 400 include an input/output (central console 172) to provide instruction to the controller 174 and provide information to the user from the controller 174, such as, but not limited to, the current settings of the MPM 400. Once example setting is the gap distance between adjacent sections of bias-ply 300 applied to the bias-ply backing material 146. A feed distance detector 404 is positioned to detect the distance the feedstock 116 has moved. A backing distance detector 403 is positioned to detect the distance the bias-ply backing material 146/formed bias-ply 158 has moved. Distance information regarding the feedstock 116 and the bias-ply backing material 146 is provided to the controller 174. The controller 174 uses the distance information in operations of the MPM 400 including when to activate the application head 130 to the place the fibers 300 from the feedstock 116 onto the bias-ply backing material 146. The MPM 400 also includes a feed tension sensor 406 that is coupled to sense tension in the feedstock 116 and a backing tense sensor 405 coupled to sense the tension in the bias-ply backing material 146. Further, the MPM 400 in one embodiment includes a bias-ply backing roll diameter sensor 407 and a feedstock roll diameter sensor 401 used by the controller 174 to set motor torque and tension. A feedstock alignment sensor 118 and a bias-ply alignment sensor 230 further provide alignment information back to the controller relating to the respective alignment of the feedstock 116 and the bias-ply backing material 146.

The controller 174 takes the information from the detectors 4043, 404 and sensors 118, 406, 407 and 401 and operates the MPM 400. In operating the MPM 400, the controller controls the operation of motors of MPM 400 such as tensions motors 144, 168, 110 and 126 designated generally as 420. Operation of the tension motors 420 includes activating the motors 420 and adjusting the speed of the motors 420. As stated above, the tension motors 420 include feedstock roll-off tension motor 110, feedstock backing material roll-up tension motor 126, bias-ply backing material roll-off tension motor 144 and bias-ply roll-up tension motor 168. Based on the speed of the motors 420 and the information gathered from the detectors 403, 404 and sensors 118, 406, 401 and 230, the controller 174 operates the application head 130 as discussed in regard to FIGS. 3A through 3E. As further illustrated in FIG. 4, the controller 174 controls the cutter 120. FIG. 4 further illustrates a heating member 422. The heating member 422 is used to tack the fibers 300 to the bias-ply backing material 146. In particular, the heating member 422 heats the pre-preg to soften or increase the tack of the material to improve adherence bias-ply backing material 146. The heating member 422 in one embodiment is a heated nip roller, such as the heated nip roller 162 of FIG. 1. In the embodiment of FIG. 4 the heating member 422 is controlled by the controller 174. Also illustrated in FIG. 4, is a slitter assembly controller 450. The slitter assembly controller 450 is used to control a slitting machine such as slitting machine 900, illustrated in FIG. 10 and described below. In the embodiment of FIG. 4, the controller 174 controls slitter assembly controller 450.

Further illustrated in FIG. 4 is a backing treatment device 453 that is controlled by the controller 174. The backing treatment device 453 is designed to increase the tackiness of the bias-ply backing material 146 to enhance adhesion of the pre-preg material 300 to the bias-ply backing material 146 to form the bias-ply 158. In one embodiment, the backing treatment device 453 is a corona discharge device similar to corona discharge devices described in commonly assigned patent application entitled "Backing for Pre-Dreg Material" having a U.S. application Ser. No. 12/701,126, filed on Feb. 5, 2010, which is herein incorporated in its entirety by reference. The MPM 400 of FIG. 4 further includes a defect detector 451. The defect detector 451, in one Embodiment, includes optical sensors in communication with the controller 174 that are designed to detect flaws or defects, such as, but limited to, overlapping sections of pre-preg, gaps between sections beyond a predefined limit, breaks in the pre-preg and undesired discrepant material present. In one embodiment, the MPM 400 is designed to form more than one layer of bias-ply (multi-layered bias-ply). In this embodiment, subsequent layers of pre-preg are formed on a formed bias-ply (the bias-ply backing plus pre-preg). In one embodiment, the formed bias-ply is substituted for the feedstock 116 and the MPM 400 is run again to form the multi-layered bias-ply. In another embodiment, the controller 450 reverses the direction of the tension motors 420 to pass the formed bias-ply under the forming assembly 430. This can occur until a desired number of layers of pre-preg have been used to form the multi-layered bias-ply.

Figure 5:
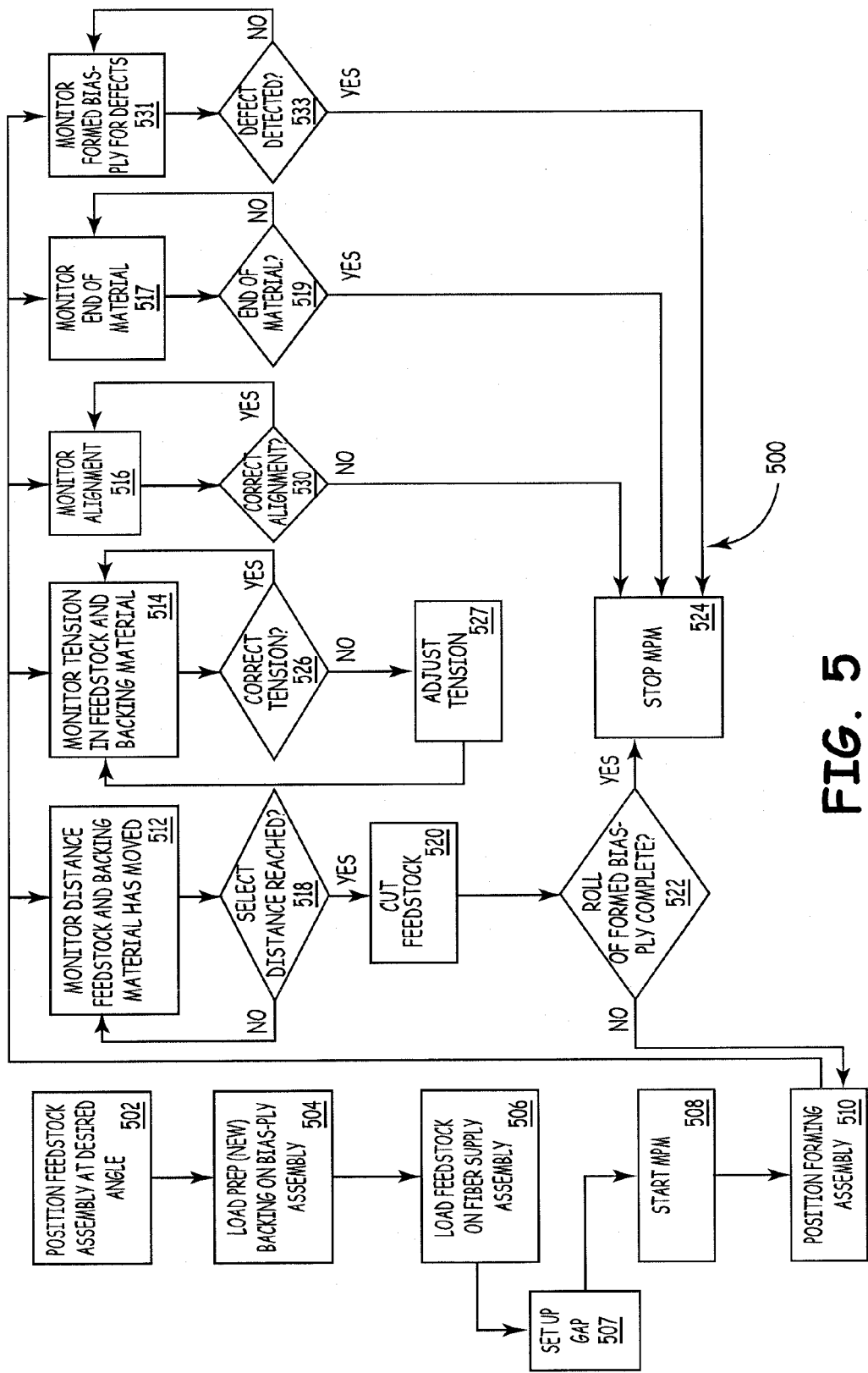
FIG. 5 is a process flow diagram of one embodiment of the present invention.

A process flow diagram 500 illustrating operation of an MPM of one embodiment is shown in FIG. 5. The process starts by positioning the feedstock assembly 103 at the desired angle in relation to the bias-ply assembly 105 to select the desired bias-ply orientation (502). Once, the positioning of the feedstock assembly 103 is complete, the bias-ply backing material 146 is loaded on the bias-ply assembly 105 (504). The feedstock 116 (which is uni-directional tape in one embodiment) is then loaded on the feedstock assembly 103 (506). The desired gap distance between adjacent segments of pre-preg placed on the bias-ply backing material is set (507). Once, the feedstock 116 and the bias-ply backing material 146 are both loaded and threaded up on the machine and the desired gap distance is set, the MPM is started (508). The application head 130 is then position (510). The positioning of the application head 130 is discussed above in regards to FIGS. 3A through 3E. As the process flow diagram 500 further illustrates, after the MPM 100 is activated, the feedstock 116 and bias-ply backing material 146 are monitored to determine distances moved (512). Also monitored are the tension in the feedstock 116 and backing material 146 (514). Further the alignment of the feedstock 116 and the new backing material 146 are monitored (516). It is determined if the correct alignment of the feedstock 116 and bias-ply backing material 146 is detected (530). If the correct alignment is detected (530), the alignment monitoring is continued (516). If the correct alignment is not detected in either of the feedstock 116 and the new bias-ply backing material 146 (530), the MPM 100 is stopped and the alignment is corrected (524). If it is determined that the tension in the feedstock 116 and the bias-ply backing material 146 is correct (526), the process continues monitoring the tension at (514). If however, the tension in the feedstock 116 and the bias-ply backing material 146 is determined to not be correct (526), the tension is corrected (527). Also monitored is the end of bias-ply backing material 146 and feedstock material 116 (517). If an end of the material is not detected (519), the end of material is continued to be monitored (517). If an end of material is detected (519), the MPM 100 is stopped (524). Further still monitored, is if the formed bias-ply has any defects (531). If no defects are detected (533), the monitoring for defects continues (531). If defects are detected (533), the MPM 100 is stopped (524).

Further if a select distance of the feedstock 116 and the bias-ply backing material 146 has not been reached (518), the distance is continued to be monitored (512). Once a select distance has been reached (518), the fibers 300 on the feedstock 520 are cut (520). It is then determined if a complete roll of bias-ply 158 has been formed (522). If a complete roll of bias-ply 158 has not been formed (522), the process continues by positioning the forming assembly accordingly (510) and the process continues. Once a complete roll of bias-ply 158 has been determined to be formed (522), the MPM stops (524).

Figure 6:
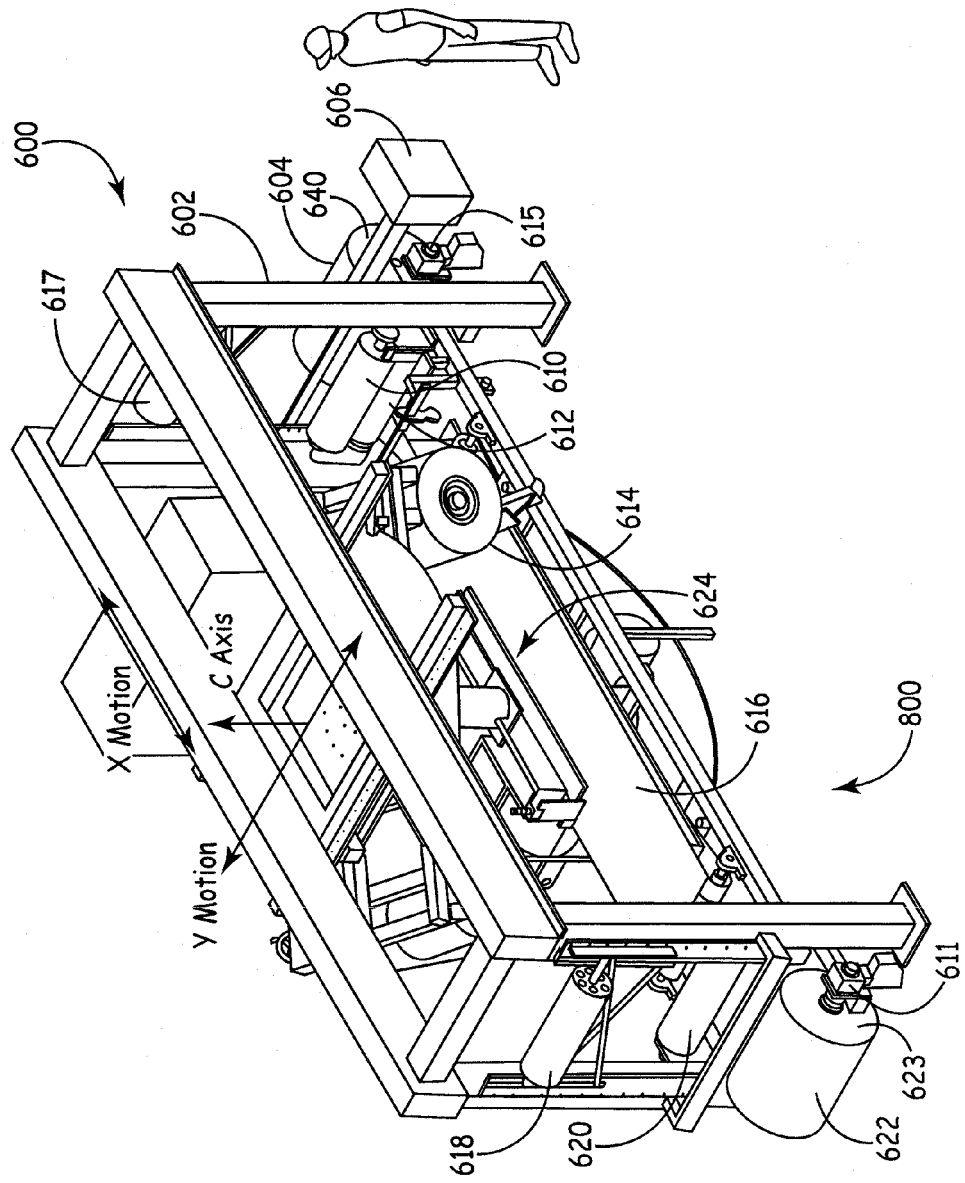
FIG. 6 is a side perspective view of a material preparation machine of another embodiment of the present invention.

Referring to FIG. 6, another embodiment of a MPM is illustrated. MPM 600 includes a frame 602 (or gantry) upon which the components of the MPM 600 are coupled. The MPM 600 includes a bias assembly 800 (or reback handling assembly) and an application head 624. The bias assembly 800 includes a vacuum conveyer 616 upon which bias-ply backing material (or reback) 622 from a bias-ply backing material roll-off 623 (or bias-ply backing material unwind 623) is passed along. The vacuum conveyer 616 keeps the bias-ply backing material 622 in place as a feedstock is being applied by the application head 624. Formed bias-ply 640 is collected on a bias-ply roll-up 604 (or bias-ply rewind 604). A roll-off accumulator 618 and a roll-up accumulator 617 adjust tension in the bias-ply backing material 622 as further discussed below. Redirect roller 620 directs the bias-ply backing material 622 on the vacuum conveyer 616. Compaction nips 612 and 610 compress transferred pre-preg onto the bias-ply backing material 622 and direct the formed bias-ply 640 on bias-ply roll-up 604.

Figure 7A:
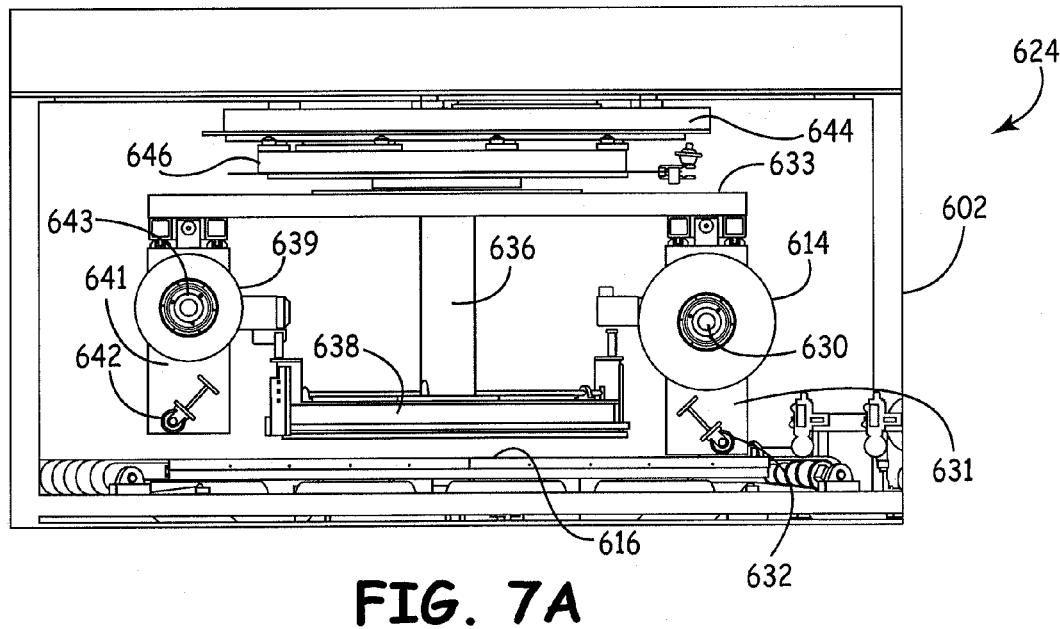
FIG. 7A is a first side view of a application head of the material preparation machine of FIG. 6.
Figure 7B:
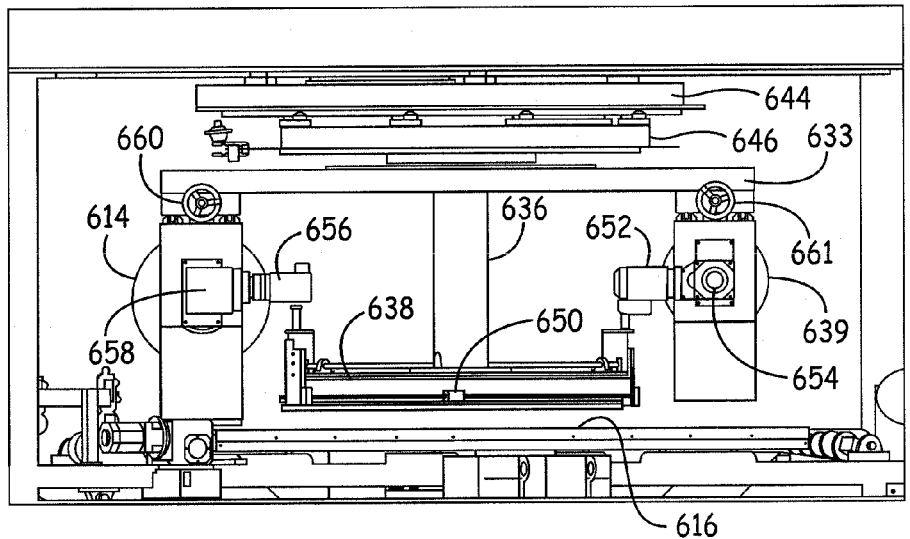
FIG. 7B is a second side view of the application head of the material preparation machine of FIG. 6.

The application head 624 is designed to move in X and Y motion directions and about a C axis as illustrated in FIG. 6. FIGS. 7A and 7B illustrate side views of the application head 624. The placement head 624 includes a compaction head 638 that is coupled to a non-rotating support 636. The non-rotating support 636 is coupled to to frame supports 646 and 644. A rotating frame member 633 is coupled to rotate about the non-rotating support 636. A feedstock unwind 614 and the feedstock backing windup 639 are coupled to the rotating frame member 633 so that a path of the feedstock can be adjusted in relation to a path of the bias-ply backing. The feedstock unwind 614 is rotationally coupled to unwind centering chuck 630, which is coupled to unwind support 631. An encoder roll 632 is further coupled to the unwind support 631. The unwind support 631 is coupled proximate a first end of the rotating frame member 633. The feedstock backing windup 639 is rotationally coupled to windup centering chuck 643, which is coupled to windup support 641. A redirect roll 642 is further coupled to the windup support 641. The windup support 641 is coupled proximate a second end of the rotating frame member 633.

A windup motor 652 (feedstock backing windup tension motor), illustrated in FIG. 7B, rotates the windup centering chuck 643. Also illustrated in FIG. 7B is a windup clutch 654 that is operationally coupled to the windup motor 652. A unwind motor 656 (feedstock unwind tension motor) is coupled to rotated the unwind centering chuck 630. An unwind clutch 658 is operationally coupled to the unwind motor 656. In one embodiment, the windup motor 652 is an induction motor and the unwind motor 656 is a servo motor. Further illustrated in FIG. 7B is cutter cylinder 650 used to cut the fiber from the feedstock backing. Also illustrated are offset adjustments 660 and 661 that are used to align the feedstock unwind 614 and the feedstock backing windup 639 of the application head 624.

Figure 7C:
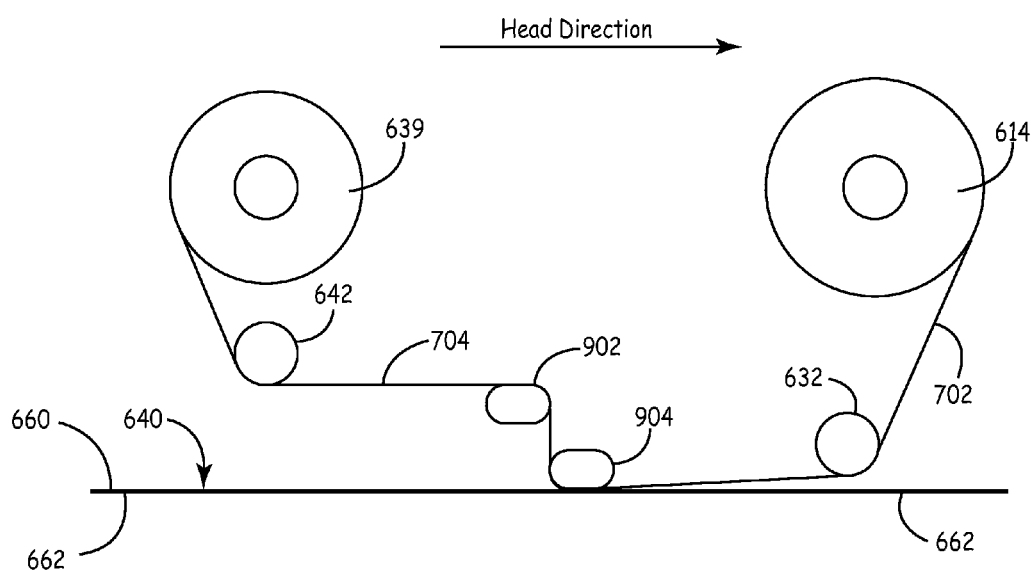
FIG. 7C is an illustration of the operation of an application head of one embodiment of the present invention.

Referring to FIG. 7C a side view illustration of the operation of the application head 624 is shown. Bias-ply backing material 662 is positioned on the vacuum conveyer 616 (not shown in this FIG. 7). Feedstock 702 from the feedstock unwind 614 is routed to a placement shoe 904 (first bar) by encoder roll 632. The placement shoe 904 presses the pre-preg 660 on the bias-ply backing material 662 as the placement head 624 is passed across a width of the backing material 662. Once the feedstock backing material is separated from its associated pre-preg, it is routed to the feedstock backing windup 639 via turn bar 902 (second bar) and redirect roll 642. The formed bias-ply 640 includes the transferred pre-preg 660 and the bias-ply backing material 662. Once the entire width of the bias-ply backing material 662 has been covered with the transferred pre-preg 600, the pre-preg 660 is cut with cutter cylinder 650 illustrated in FIG. 7B. Then, the application head 624 is repositioned and the process starts again once the bias-ply backing material 662 has moved a select distance on the vacuum conveyer 616.

Figure 8:
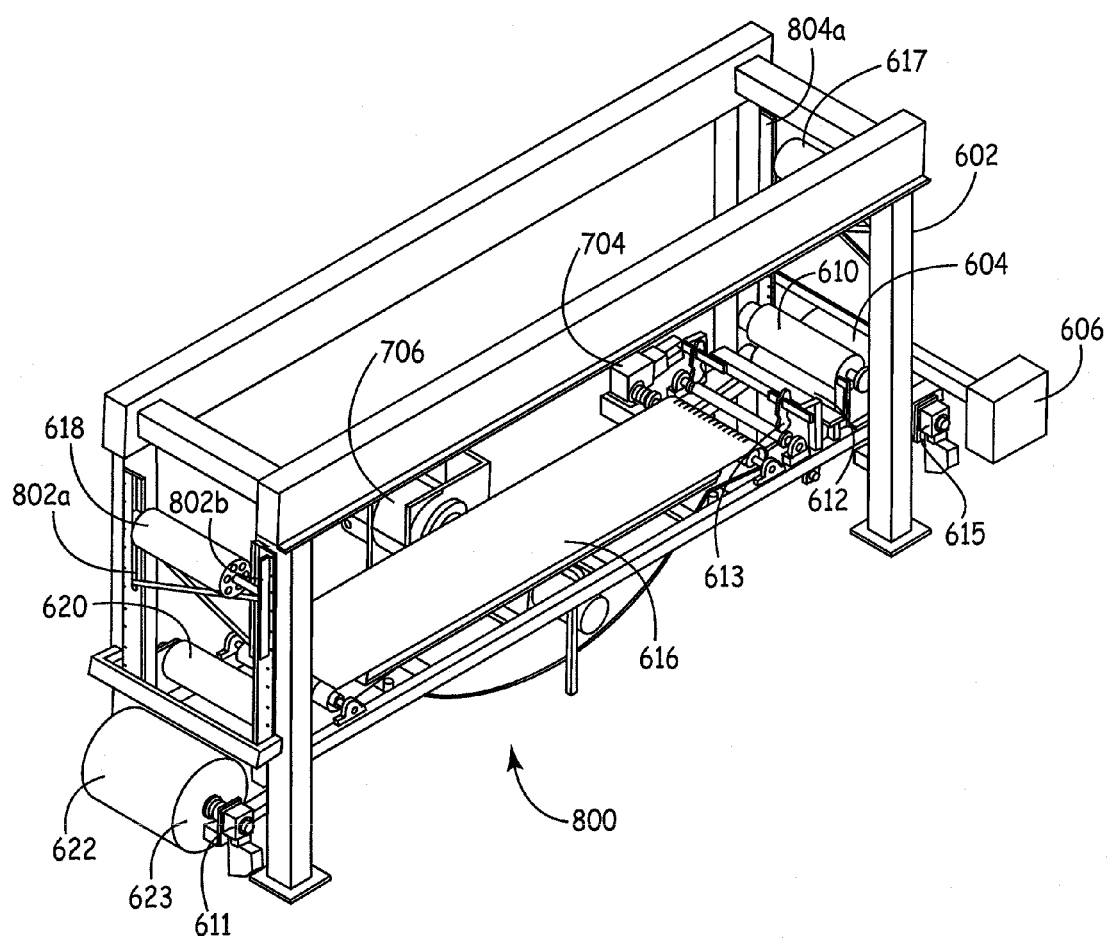
FIG. 8 is a side perspective view of a bias-ply assembly portion of the material preparation machine of FIG. 6.

FIG. 8 illustrates a side perspective view of the bias-assembly 800 of the MPM 600 of FIG. 6. As illustrated, bias-ply backing material roll-off 623 is rotational coupled to a chuck that is rotationally moved via roll-off drive motor 611 (bias-ply backing roll-off tension motor). Bias-ply windup roll-up 604 is similarly coupled to a chuck that is rotationally moved via roll-up drive motor 615 (bias-ply roll-up tension motor). Further illustrated, is a vacuum blower 706 for the vacuum conveyer 616 and vacuum conveyer servo motor 704. This embodiment also includes slitters 612 to trim the edges of formed bias-ply 640 and a controller 606 that controls function of the MPM 600. With the use of the slitters 612, the width of the formed bias-ply 640 can be less than the width of the bias-ply backing material 622. Hence, the width of the formed bias-ply 640 can be less than or equal to the width of the bias-ply backing material 622. In addition, the bias-ply backing material 622 can have any desired width that the MPM 600 will accommodate.

Figure 9A:
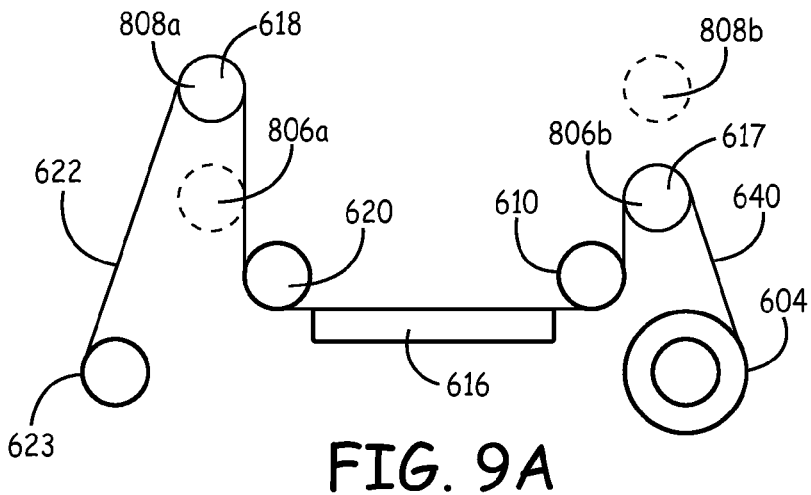
FIGS. 9A through 9C are illustrations of a table web control system of one embodiment of the present invention.
Figure 9B:
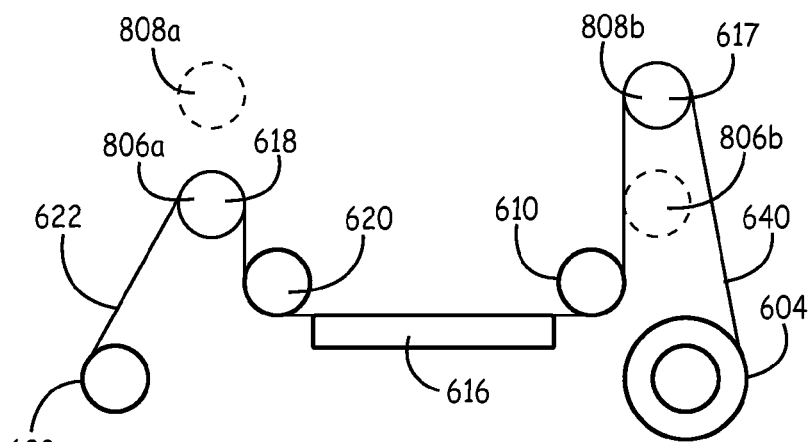
Figure 9C:
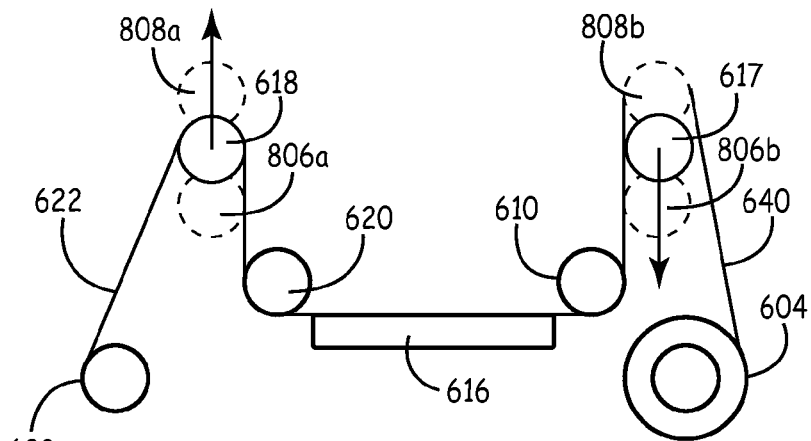
Figure 10:
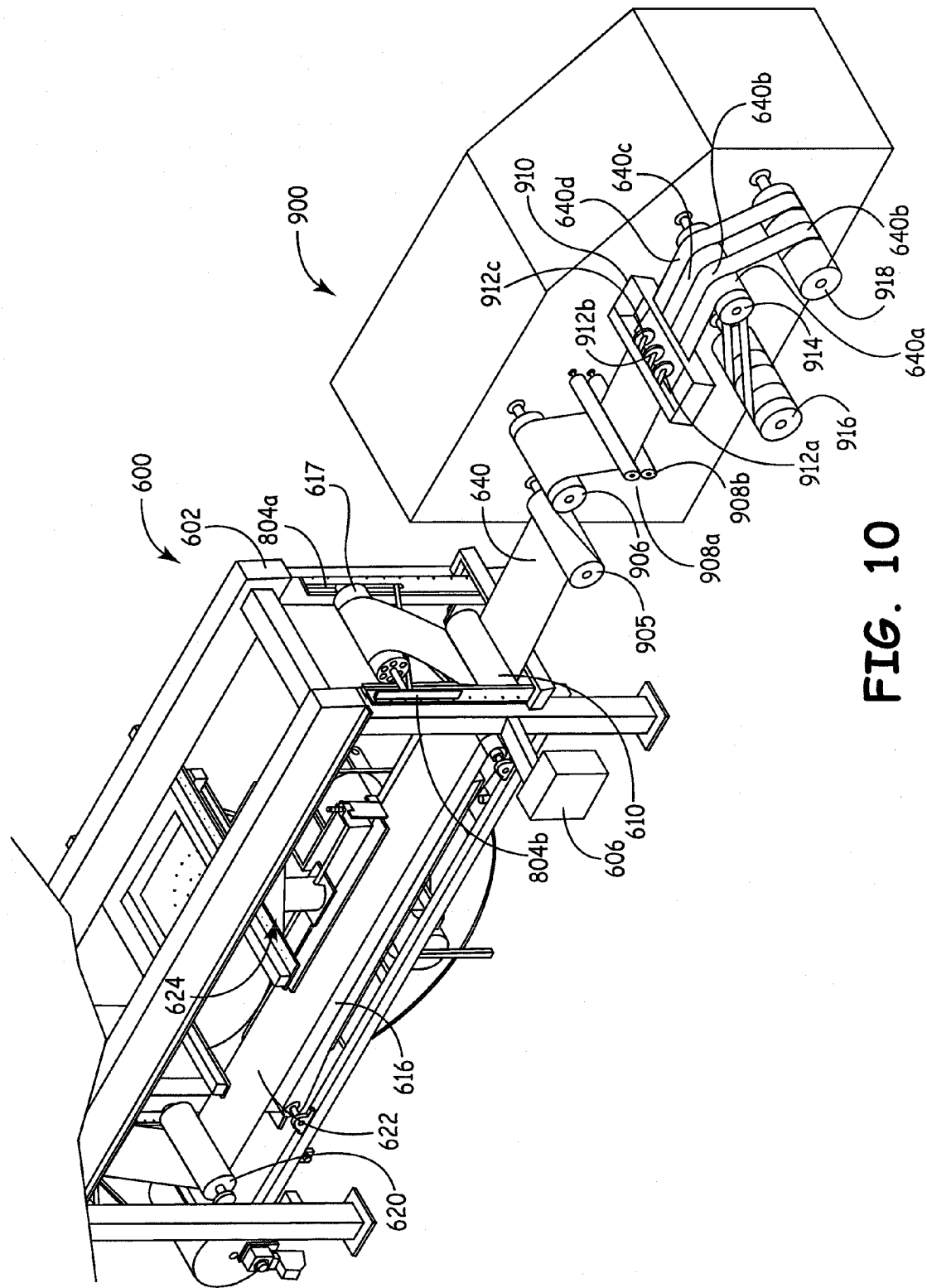
FIG. 10 is a side perspective view of another embodiment of a MPM machine with a slitter device of one embodiment of the present invention.

Roll-off accumulator 618 and roll-up accumulator 617 are used to control tension in the backing material 622 and the formed bias-ply 640. In one embodiment, roll-off accumulator 618 is pneumatically loaded to set web tension in the bias-ply backing material 622 by slidably adjusting the position of the roll-off accumulator 618 engaged with the bias-ply backing material 622 via tracks 802a and 802b. Roll-up accumulator, 617 is similarly pneumatically loaded to set web tension in the formed bias-ply 640 by slidably adjusting the position of the windup accumulator 617 engaged with the formed ply 640 via tracks 804a and 804b (track 804b is illustrated in FIG. 10). How the roll-off accumulator 618 and the roll-up accumulator 617 operate to control tension is illustrated in FIGS. 9A through 9C. Referring to FIG. 9A, an illustration of the positioning of the roll-off accumulator 618 and roll-up accumulator 617 at a beginning of a move cycle is provided. At the beginning of this cycle, the roll-off accumulator 618 is in position 808a, which is at a farthest distance from the bias-ply backing material roll-off 623. The roll-up accumulator 617, at the beginning of the cycle is at position 806b which is at a closest position to the bias-ply roll-up 604. The bias-ply backing material 622/formed bias-ply 640 are then moved along the vacuum conveyer 616 once the roll-off accumulator 618 and roll-up accumulator 617 are in the positions as illustrated in FIG. 9A. After the move cycle, the roll-off accumulator 618 and roll-up accumulator 617 are positioned, as illustrated in FIG. 9B. In particular, the roll-off accumulator 618 is at positioned 806a, which is at a closest distance to the bias-ply backing material roll-off 623. Meanwhile, the roll-up accumulator 617 is at position 808b, which is a position that is the farthest from the formed bias-ply roll-up 604. During laydown of the pre-preg 660 (FIG. 7C) on the bias-ply feedstock that a path of the feedstock can be adjusted in relation to a path of the bias-ply backing. The feedstock unwind 614 is rotationally coupled to unwind centering chuck 630, which is coupled to unwind support 631. An encoder roller 632 is further coupled to the unwind support 631. The unwind support 631 is coupled proximate a first end of the rotating frame member 633. The feedstock backing windup 639 is rotationally coupled to windup centering chuck 643, which is coupled to windup support 641. A redirect roller 642 is further coupled to the windup support 641. The windup support 641 is coupled proximate a second end of the rotating frame member 633.

A windup motor 652 (feedstock backing windup tension motor), illustrated in FIG. 7B, rotates the windup centering chuck 643. Also illustrated in FIG. 7B is a windup clutch 654 that is operationally coupled to the windup motor 652. An unwind motor 656 (feedstock unwind tension motor) is coupled to rotate the unwind centerin chuck 630. An unwind clutch 658 is operationally coupled to the unwind motor 656. In one embodiment, the windup motor 652 is an induction motor and the unwind motor 656 is a servo motor. Further illustrated in FIG. 7B is cutter cylinder 650 used to cut the fiber from the feedstock backing. Also illustrated are offset adjustments 660 and 661 that are used to align the feedstock unwind 614 and the feedstock backing windup 639 of the application head 624.

Referring to FIG. 7C, a side view illustration of the operation of the application head 624 is shown. Bias-ply backing material 662 is positioned on the vacuum conveyor 616 (not shown in FIG. 7C). Feedstock 702 from the feedstock unwind 614 is routed to a placement shoe 904 (first bar) by encoder roll 632. The placement shoe 904 presses the pre-preg 660 on the bias-ply backing material 662 as the placement head 624 is passed across a width of the backing material 662. Once the feedstock backing material 704 is separated from its associated pre-preg, it is routed to the feedstock backing windup 639 via turn bar 902 (second bar) and redirect roll 642. The formed bias-ply 640 includes the transferred pre-preg 660 and the bias-ply backing material 662. Once the entire width of the bias-ply backing material 662 has been covered with the transferred pre-preg 600, the pre-preg 600 is cut with cutter cylinder 650 illustrated in FIG. 7B. Then, the application head 624 is repositioned and the process starts again once the bias-ply backing material 662 has moved a select distance on the vacuum conveyer 616.

FIG. 8 illustrates a side perspective view of the bias assembly 800 of the MPM 600 of FIG. 6. As illustrated, bias-ply backing material roll-off 623 is rotationally coupled to a chuck that is rotationally moved via roll-off drive motor 611 (bias-ply backing roll-off tension motor). Bias-ply windup roll-up 604 is similarly coupled to a chuck that is rotationally moved via roll-up drive motor 615 (bias-ply roll-up tension motor). Further illustrated, is a vacuum blower 706 for the vacuum conveyor 616 and vacuum conveyor servo motor 704. This embodiment also includes slitters to trim the edges of formed bias-ply 640 and a controller 606 that controls function of the MPM 600. With the use of the slitters, the width of the formed bias-ply 640 can be less than the width of the bias-ply backing material 622. Hence, the width of the formed bias-ply 640 can be less than or equal to the width of the bias-ply backing material 622. In addition, the bias-ply backing material 622 can have any desired width that the MPM 600 will accommodate.

Roll-off accumulator 618 and roll-up accumulator 617 are used to control tension in the backing material 622 and the formed bias-ply 640. In one embodiment, roll-off accumulator 618 is pneumatically loaded to set web tension in the bias-ply backing material 622 by slidably adjusting the position of the roll-off accumulator 618 engaged with the bias-ply backing material 622 via tracks 802a and 802b. Roll-up accumulator 617 is similarly pneumatically loaded to set web tension in the formed bias-ply 640 by slidably adjusting the position of the windup accumulator 617 engaged with the formed ply 640 via tracks 804a and 804b (track 804b is illustrated in FIG. 10). How the roll-off accumulator 618 and the roll-up Accumulator 617 operate to control tension is illustrated in FIGS. 9A through 9C. Referring to FIG. 9A, an illustration of the positioning of the roll-off accumulator 618 and roll-up Accumulator 617 at a beginning of a move cycle is provided. At the beginning of this cycle, the roll-off accumulator 618 is in position 808a, which is at a farthest distance from the bias-ply backing material roll-off 623. The roll-up accumulator 617, at the beginning of the cycle is at position 806b, which is at a closest position to the bias-ply roll-up 604. The bias-ply backing material 622/formed bias-ply 640 are then moved along the vacuum conveyer 616 once the roll-off accumulator 618 and roll-up accumulator 617 are in the positions as illustrated in FIG. 9A. After the move cycle, the roll-off accumulator 618 and roll-up accumulator 617 are positioned, as illustrated in FIG. 9B. In particular, the roll-off accumulator 618 is at position 806a, which is at a closest distance to the bias-ply backing material roll-off 623. Meanwhile, the roll-up accumulator 617 is at postion 808b, which is a position that is the farthest from the formed bias-ply roll-up 604. During lay down of the pre-preg 600 (FIG. 7C) on the bias-ply feedstock backing material 622, the roll-off accumulator 618 and roll-up accumulator 617 are being moved to reset their respective positions to the beginning of the cycle as illustrated in FIG. 9C. In an embodiment, the controller 606 controls the tension motors 611 and 615 based, at least in part, on the then current position of accumulators 617 and 618.

Referring to FIG. 10, another embodiment of an MPM 600 is illustrated. This embodiment includes an integrated slitter device 900. In this embodiment, the slitter device 900 is controlled by controller 606 of the MPM 600. The slitter device 900 is used to cut formed bias-ply 640 into two or more strips of select widths for a particular application. The example slitter device 900 of this embodiment includes redirect rollers 905 and 906 that redirect the formed bias-ply 640 from bias-ply roller 610 of the MPM 600. The bias-ply 640 passes then through nip rollers 908a and 908b and into knife holder 910. The knife holder 910 holds a plurality of knives 912a, 912b, and 912c that can be selectively positioned to cut the bias-ply 640 into as many strips as desired having select widths. In the example embodiment, three knives 912a, 912b, and 912c are used to cut the bias-ply 640 into four strips of bias-ply 640a, 640b, 640c, and 640d. Redirect roller 914 is used to direct bias-ply strips 640a and 640c to be collected on rewind 916 and bias-ply strips 640b and 640d to be collected on rewind 918. Hence, the sheet of formed bias-ply 640 is slit into strips of bias-ply 640a, 640b, 640c and 640d that can be used to accommodate a specific application.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:
1. A method of foaming a bias-ply with an automated material preparation device, the method comprising:
laying out a length of bias-ply backing material, the bias-ply backing material having a select width, the bias-ply backing material configured to be removed from the bias-ply during formation of a part on a tool;
adjustably controlling a tension in the laid out length of the stretchable bias-ply backing material;
laying out a length of feedstock having feedstock backing material and a layer of fiber-reinforced pre-preg material, the feedstock crossing a select portion of the width of the bias-ply backing material along a first section of the bias-ply backing material at a select angle, wherein the select angle between the feedstock and the bias-ply backing material is adjustable;
transferring the layer of fiber-reinforced pre-preg from the feedstock backing material directly onto the first section of the bias-ply backing material; and bias-ply backing material; and
cutting the transferred layer of fiber-reinforced pre-preg material on the first section of bias-ply backing material with an automated cutter while at least of portion of the layer of fiber-reinforced pre-preg material is in contact with the bias-ply backing material to form a bia-ply having the layer of fiber-reinforced pre-preg material at a select orientation relative to an edge of the formed bias-ply.

2. The method of claim 1, further comprising:
cutting the layer of fiber-reinforced pre-preg material of the feedstock without completely cutting the feedstock backing material;
once the layer of fiber-reinforced pre-preg material is cut, without cutting the feedstock backing material, lifting the feedstock away from the bias-ply backing material;
positioning a remaining portion of pre-preg material on the feedstock over the bias-ply backing material;
moving the bias-ply backing material, wherein the feedstock is positioned and the bias-ply backing material is moved such that a remaining portion of pre-preg material on the feedstock is positioned across a second section of the bias-ply backing material proximate the first section of the bias-ply backing material;
positioning the feedstock against the bias-ply backing material;
transferring the remaining portion of pre-preg on the feedstock to the second section of bias-ply backing material; and
cutting the remaining portion of pre-preg material on the feedstock from the transferred pre-preg material on the second section of the bias-ply backing material.

3. The method of claim 2, further comprising:
repeating the forming of pre-preg material on subsequent sections of the bias-ply backing material to form a bias-ply of a select length and width having pre-preg material with fibers at a select orientation.

4. The method of claim 3, further comprising:
selecting at least one of a gap and an overlap distance between adjacent sections of pre-preg material transferred on the bias-ply backing material.

5. The method of claim 2, further comprising:
monitoring a moving distance of the feedstock;
monitoring a moving distance of the bias-ply backing material; and
based on the monitored distances, positioning the feedstock against the bias-ply backing material.

6. The method of claim 1, further comprising:
adjusting the tension in at least one of the feedstock and bias-ply backing material; and
adjusting an alignment of at least one of the feedstock and the bias-ply backing material.

7. The method of claim 1, further comprising:
slitting the formed bias-ply into a select number of strips of select widths.

8. The method of claim 1, further comprising:
heating the layer of fiber-reinforced pre-preg material to enhance adhesion of the layer of fiber-reinforced pre-preg material to the bias-ply backing material; and
compressing the layer of fiber-reinforced pre-preg material onto the bias-ply backing material.

9. The method of claim 1, wherein transferring the layer of fiber-reinforced pre-preg material to the first section of the bias-ply backing material further comprises:
selectively pressing the layer of fiber-reinforced pre-preg from the feedstock onto the bias-ply backing material with a first forming bar;
striping the feedstock backing material from the layer of fiber-reinforced pre-preg material of the feedstock with the first forming bar; and
directing the feedstock backing material to a feedstock backing windup with a second forming bar.

10. The method of claim 1, further comprising:
monitoring the formed bias-ply for defects.

11. The method of claim 1, further comprising:
treating the bias-ply backing material with a corona discharge to enhance adhesion with the pre-preg material of the feedstock.

12. The method of claim 2, further comprising:
applying at least one additional fiber-reinforced pre-preg material over the formed bias-ply.

13. The method of claim 1, wherein the stretchable bias-ply backing material is made from polyethylene.

14. The method of claim 1, further comprising:
laying out the length of bias-ply backing material between a bias-ply backing roll-off and a bias-ply roll-up; and
adjusting the tension in the laid out length of bias-ply backing material with at least one accumulator that is engaged with the bias-ply backing material by selectively changing the disance between the at least one accumulator and at least one of the bias-ply backing roll-off and the bias ply roll-up.

15. A method of forming a bias-ply with an automated material preparation device, the method comprising:
laying out a length of a stretchable bias-ply backing material, the stretchable bias-ply backing material having a select width, lacking reinforcing fibers or yarn in the stretchable bias-ply backing material, and configured to be removed from the bias-ply during formation of a part on a tool;
holding the stretchable bias-ply backing material in place with a vacuum conveyer;
laying out a length of feedstock having feedstock backing material and a layer of fiber-reinforced pre-preg material directly over an exposed portion of the bias-ply backing material, the feedstock crossing a select portion of the width of the stretchable bias-ply backing material along a first section of the stretchable bias-ply backing material at a select angle;
transferring the layer of fiber-reinforced pre-preg material from the feedstock backing material directly onto the first section of the stretchable bias-ply backing material with an application head to place the layer of fiber-rein forced pre-preg material in direct contact with the first section of Ihe stretchable bias-ply backing material: and
cutting the transferred layer of fiber-reinforced pre-preg material on the first section of stretchable bias-ply backing material with an automated cutter while at least of portion of the layer of fiber-reinforced pre-preg material is positioned on the bias-ply backing material and while the application head is in contact with a portion of the feedstock to form a bias-ply having the layer of fiber-reinforced pre-preg material at a select orientation relative to an edge of the formed bias-ply with a removable stretchable bias-ply backing material.

16. A method of forming a bias-ply with an automated material preparation device, the method comprising:
laying out a length of pliable bias-ply backing material between a bias-ply backing roll-off and a bias-ply roll-up, the pliable bias-ply backing material having a select width and configured to be removed from the bias-ply during formation of a part on a tool;
adjustably controlling tension in the pliable bias-ply backing material with at least one accumulator that is engaged with the pliable bias-ply backing material by selectively changing a distance between the at least one accumulator and at least one of the bias-ply backing roll-off and the bias-ply roll-up;

passing along the laid out length of pliable bias-ply backing material with a vacuum conveyer;

holding the pliable bias-ply backing material in place with the vacuum conveyer;

laying out a length of feedstock having feedstock backing material and a layer of fiber-reinforced pre-preg material directly over an exposed portion of the pliable bias-ply backing material, the feedstock crossing a select portion of the width of the pliable bias-ply backing material along a first section of the pliable bias-ply backing material at a select angle;

transferring the layer of fiber-reinforced pre-preg material from the feedstock backing material directly onto the first section of the pliable bias-ply backing material to place the layer of fiber-reinforced pre-preg material in direct contact with the first section of the pliable bias-ply backing material: and cutting the transferred layer of fiber-reinforced pre-preg material on the first section of pliable bias-ply backing material with an automated cutter to form a bias-ply having the layer of fiber-reinforced pre-preg material at a select orientation relative to an edge of the formed bias-ply.

17. The method of claim 1, further comprising handling and stabilizing the laid out length of stretchable bias-ply backing material with a vacuum conveyer.

18. The method of claim 15, further comprising adjusting the select angle between the feedstock and the bias-ply backing material.

19. The method of claim 16, further comprising selecting the select orientation of the layer of fiber-reinforced pre-preg material by adjusting the select angle between the feedstock and the bias-ply backing material with an adjustable feature of the automated material preparation device configured to adjustably position the feedstock relative to the bias-ply backing material.

* * * * *